March 11, 1969    J. F. WALDORFF    3,431,863
GUIDE MEANS

Filed May 7, 1966    Sheet 1 of 2

United States Patent Office 3,431,863
Patented Mar. 11, 1969

3,431,863
GUIDE MEANS
Jorgen F. Waldorff, Nordborg, Denmark, assignor to Danfoss A/S, Nordborg, Denmark
Filed Mar. 7, 1966, Ser. No. 540,443
Claims priority, application Germany, Mar. 5, 1965,
D 46,690
U.S. Cl. 103—131         4 Claims
Int. Cl. F04c 1/16, 3/00

ABSTRACT OF THE DISCLOSURE

Rotary apparatus useable as a hydraulic pump or motor provided with a guiding device for a working member which on movement in a circular path is displaced in a plane parallel to itself in planetary or orbital movement. A gear wheel is fixed to a main shaft and has peripheral teeth engageable with internal teeth of an internally toothed ring gear having a larger number of teeth than the inner gear wheel. The ring gear is movable with respect to the pump or motor housing in conjunction with a planetary constraint device or guiding device which causes the ring gear axis to follow a complete circular path with each revolution of the gear wheel. The guiding device is a valve plate of the distributor valve having peripheral circularly cut recesses around the outer periphery of the ring gear and an equal number of rollers attached to the housing engaging in the recesses in such a way as to allow the ring gear axis to follow a circular path. The relative movement between the ring gear and the housing can be easily adjusted by varying the difference between the roller and recess diameters with respect to the difference between the radial distances of their centers from the respective ring gear or main shaft axis. The friction effect is minimized since the rollers are rotatable and are substantially in line contact with the recess surfaces. Another valve plate has a face adjoining the face of the guiding device with both faces having inlet and outlet ports. The valve plate functioning as the guiding device serves as a closure member which alternately opens and closes one or more ports on the other valve plate.

---

This invention relates to guide means particularly adapted for guiding a working element of a rotary device. In another aspect, this invention relates to a rotary device including such guide means.

The expression "working element of a device" is intended to refer to an element of a device which performs the function of the device. Thus, for example, in a gear pump, the gears would be working elements of the device, i.e., of the gear pump. A device, the working element or elements of which rotates or has a rotational moment imparted thereto may be referred to as a "rotary device."

In the prior art, a working element of a rotary device is guided by providing a set of teeth at the periphery of the working element and an annular casing having a like number of teeth which engage the teeth of the working element. However, this arrangement has a number of serious disadvantages. For one thing, there is a substantial loss of energy due to friction. Also, the fabrication of the two sets of teeth requires great care and is expensive. According to another prior art arrangement, the working element is mounted on two tool blocks which are vertically displaceable with respect to each other; this has the disadvantage of being complicated.

The guide means of the invention guides the working element in movement parallel to the direction of a rotational moment applied to the working element. The guide means essentially constitutes arcuate recesses in the periphery of the working element and rollers rotatably mounted on fixed axes to engage the arcuate recesses. Generally, the rollers will each be in the configuration of a cylinder having a diameter smaller than the diameter of the recesses. Generally, the centers of the rollers will be arranged to lie on a first common circle and the centers of the arcuate recesses will be arranged to lie on a second common circle. In such an arrangement it is provided that the diameter of the second common circle be greater than the diameter of the first common circle.

The rotary device incorporating the guide means of the invention includes a casing enclosing an annular element, and an inner element disposed internally and eccentrically of the annular element. The annular element has an inner surface having alternating convexities and concavities. Similarly, the inner element has an outer surface having alternating convexities and concavities. For each of the elements, since the concavitites and convexities alternate, the number of concavities is equal to the number of convexities. However, for the sake of convenience and simplicity of expression hereinafter in the specification and in the claims, sometimes only the concavities or only the convexities will be referred to. The number of the convexities of the annular element exceeds, by at least one, the number of the convexities of the inner element. Specific embodiments of the rotary device of the invention include gear pumps and gear engines. Using gear terminology, one skilled in the art may refer to the annular element as a "spur internal gear," in view of the internally disposed alternating concavities and convexities, and to the inner element as a "spur external gear," in view of the externally disposed alternating concavities and convexities.

The rotary device further includes a shaft rotatably mounted in the casing. The shaft mounts either the annular element or the inner element for rotation with the shaft. The guide means of the invention permits the center of the element which is not mounted on the shaft to define a revolution of a circular path about the axis of the shaft for each fraction of a revolution of the shaft; when the shaft is rotated, a rotational mount is imparted to this element by virtue of engagement of the concavities and convexities thereof with the convexities and concavities of the element which is mounted on the shaft.

The concavities and convexities, respectively, of the inner element are engageable with the convexities and concavities, respectively, of the annular element. The distance between a substantially opposed concavity and convexity of the annular element is at least equal to the distance between substantially opposed concavities of the inner element. Accordingly, upon rotation of the shaft, at any given moment only some of the concavities and convexities, respectively, of the inner element are in engagement with only some of the convexities and concavities, respectively, of the annular element. The expression "substantially opposed" refers to the closest approximation to perfect opposition. Thus, the expression "a substantially opposed concavity and convexity of the annular element" refers to any concavity and convexity of the annular element which come at least as close to perfect opposition as any other concavity and convexity of the annular element. The expression "substantially opposed concavities of the inner element" is defined in like manner. The engagement of the inner element with the annular element motivates the element which is not mounted on the shaft in the circular path in which it is guided by the above referred to guide means.

An inlet conduit and an outlet conduit, for fluid, defined through the casing are provided. Because of the above described configurations of the annular and inner element, spaces exist between the concavities and convexities thereof. These spaces serve as fluid chambers. A first plate is mounted for rotation of its center about the axis of the shaft. This plate is disposed in such a manner that a face thereof constitutes a common wall of the chambers. A conduit or passage is provided through the plate to communicate with one of the chambers. A second plate is fixedly mounted in the casing and disposed so that a face thereof contacts the face of the first plate which is opposed to the face serving as a common wall of the chambers. A conduit or passage is provided through the second plate, which conduit or passage communicates with either the inlet conduit or the outlet conduit.

The respective conduits of the first and second plates each have an opening at their respective contacting faces. Since the center of the first plate follows a circular path about the axis of the shaft, the opening on its face also follows a circular path. The opening on the face of the second plate is so disposed that this circular path intersects it. During the intersecting of the two openings they are in at least partial registry and, thereby, communication is established between the chamber and the inlet or outlet conduit.

It should be appreciated that in referring herein to a conduit communicating with a chamber, it is intended to denote a dynamic rather than a static situation. In other words, when the shaft is rotating the chamber in question will continuously and cyclically be expanding and contracting due to the respective configurations and motions of the inner and annular elements. Due to this action, a fluid leaving the device is at a significantly different pressure than when it was introduced into the device. Thus, for example, when the shaft is driven by an external power source such as an electric motor, the device is a form of gear pump.

Generally, a conduit system as hereinabove described is provided for each of the chambers. Furthermore, generally, each of the chambers is provided with two conduit systems as hereinabove described, one of the conduit systems communicating with the inlet conduit and the other with the outlet conduit. Furthermore, two common conduits or headers are provided. One of these common conduits serves as a common link between each of the conduits of the second plate intended ultimately to communicate with the inlet conduit and the other common conduit serves similarly with respect to the conduits of the second plate intended ultimately to communicate with the outlet conduit.

When the second plate is provided with a second conduit in order that means for communicating with both the inlet and the outlet conduit exist, the opening of the second conduit on the face of the second plate contacting a face of the first plate is disposed in the circular path followed by the opening of the first plate. However, the two openings on the second plate are sufficiently spaced apart so that only one at a time is in at least partial registry with the opening on the first plate. Therefore, alternatingly, communication is established between the chamber and the inlet conduit or the outlet conduit and, accordingly, fluid is permitted into the chamber and then is permitted to leave the chamber. Thus, the arrangement described serves as distribution valve means.

Since a fluid is communicating with the chambers at only one side of the elements in the arrangement above described, that side being namely the side at which the plates are disposed, an unbalanced pressure is exerted on the elements. Accordingly, for smooth, efficient operation, the need sometimes arises to counteract or balance this unbalanced pressure. Accordingly, there is provided a conduit communicating between one of the common conduits and pressure exerting means displaceably mounted in a wall of the casing opposite the face of the second plate having the opening or openings and at a side of the elements opposite the side thereof at which the plates are disposed. The pressure exerting means is displaceable toward the elements under the influence of fluid pressure transmitted through the conduit communicating between the common conduit and the pressure exerting means. Thereby, a fluid pressure is exerted against the elements in a direction to counteract the fluid pressure on the elements at the opposite side thereof. Generally, one of these arrangements is provided with respect to each of the common conduits.

In a preferred arrangement, a third plate is provided. This plate is mounted at the side of the elements opposite the side thereof at which the first and second plates are disposed, whereby the third plate constitutes a second common wall of the chambers.

It is preferred that the above referred to openings on the discs each be in the form of a radial groove. When the second disc is provided with a pair of conduits for a chamber, generally the two radial grooves on the second disc will be separated by a circumferential distance at least equal to the width of the radial slot of the first disc.

In gear pumps of the prior art, as distributor valve means there were used two concentrically arranged rotational slide valve elements, of which one was fixed to the inner element of the gear pump and the other to the annular element of the gear pump. The number of control openings in one slide valve element corresponded to the number of teeth of the inner element and the number of control openings in the other slide valve element corresponded to the number of teeth of the annular element. Consequently, in operation, a commutator effect was attained. The arrangement of the present invention provides distributor valve means which is simpler in construction than the distributor valve means of the prior art and which also requires shorter conduits and can more easily be fabricated.

A specific embodiment of the invention will now be described by reference to the drawings, in which.

Figure 1:
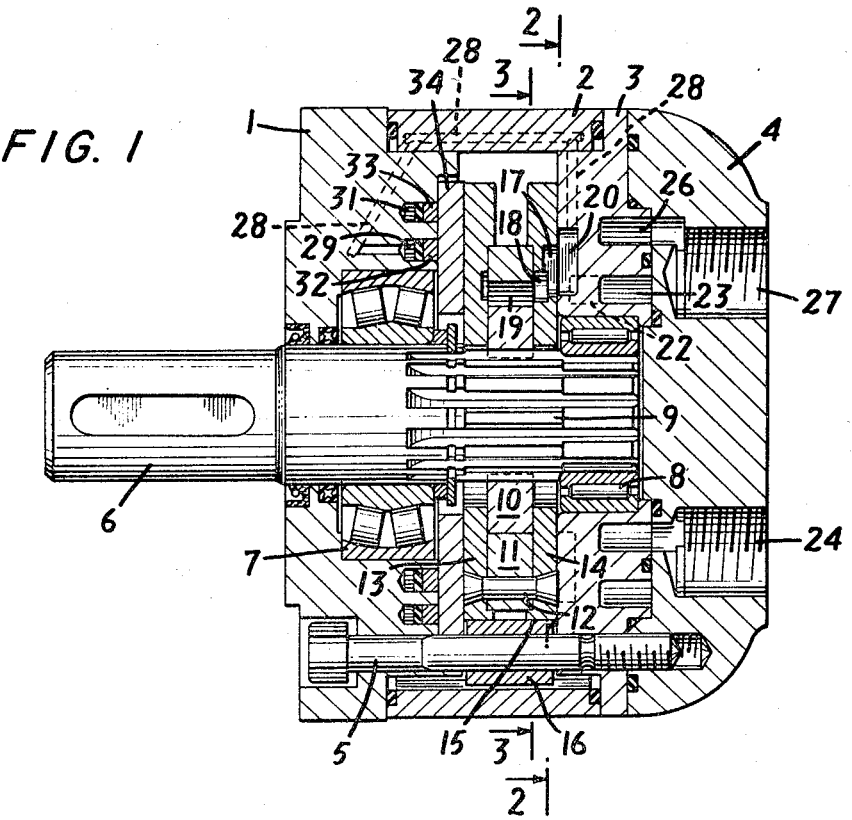
FIG. 1 is a longitudinal section of a gear pump according to the invention.
Figure 2:
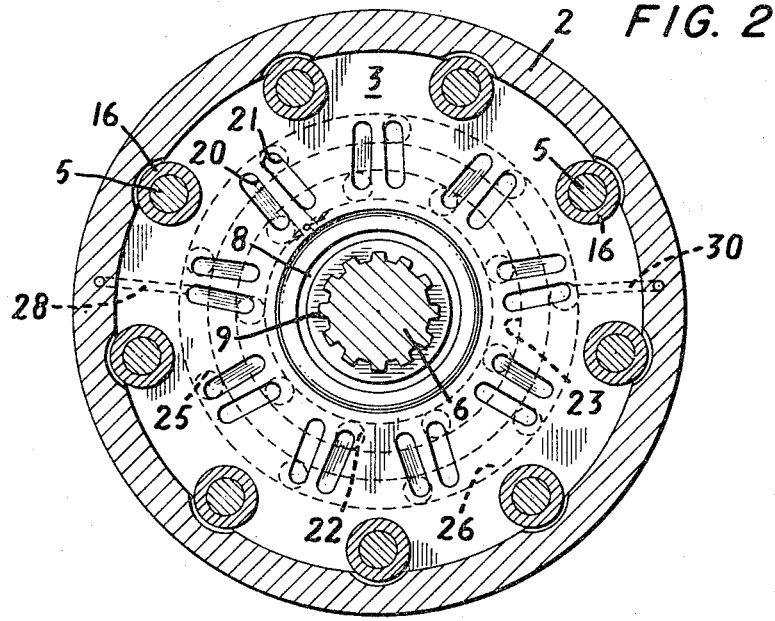
FIG. 2 is a cross section along the line A—A in FIG. 1.

The casing of the gear pump consists of a front wall member 1, a cylindrical side wall member 2 and a back wall member 4, which are interconnected by means of screws 5 and sealed by means of sealing rings (not shown). A main shaft 6 is rotatably mounted in the casing by means of a bearing 7 in the front wall member 1 and a bearing 8 in a plate 3. The periphery of the plate 3 is inserted between the cylindrical side wall member 2 and the back wall member 4 and, thereby, the plate 3 is fixedly mounted in the casing. The shaft 6 is provided with a slotted portion of conventional construction on which is mounted for rotation with the shaft an inner element 10 having alternating concavities and convexities or teeth on its outer peripheral surface. The teeth of the inner element 10 are in engaging relationship with the alternating concavities and convexities or teeth on the inner peripheral surface of an annular element 11. Two plates 13 and 14 are fixedly mounted on the proposed faces of the outer element 11 by means of rivets 12. Spaces or chambers exists between the concavities and convexities or teeth of the elements 10 and 11.

Figure 3:
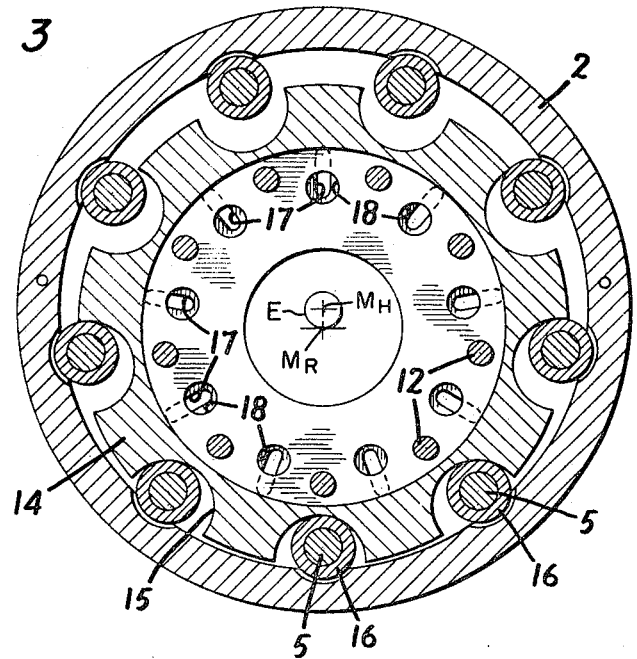
FIG. 3 is a cross section along the line B—B in FIG. 1, in which, however, the parts of FIG. 4 have been omitted.
Figure 4:
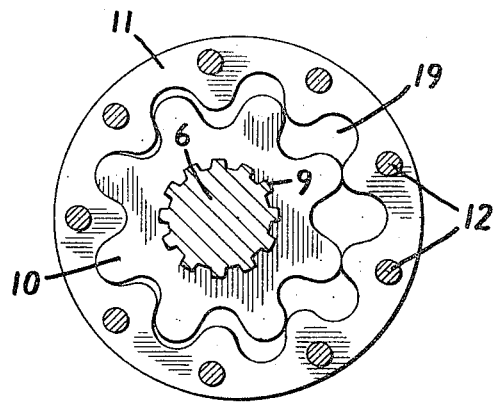
FIG. 4 is a plan view of the two major elements of the gear pumps with a shaft and rivets shown in section.

The plates 13 and 14 at their peripheries are provided with recesses 15 each in the form of a sector of a circle. The recesses 15 correspond in number to the number of the screws 5. On the screws 5 are rotatably mounted cylinders or rollers 16 which intermesh with the recesses 15. The diameter of each of the cylinders 16 is smaller than the diameter of each of the recesses 15, whereby the cylinders 16 in following an arcuate path along the walls of the recesses 15 cause the center $M_R$ of the annular element 11 to follow a circular path E about the center $M_H$ of the shaft 6 (FIG. 3). The centers of the cylinders lie on a first common circle and the centers of the recesses lie on a second common circle. The center of each recess is, of course, the geometric center of a circle an arc of which defines the periphery of the recess. The diameter of the second common circle is greater than the diameter of the first common circle. The center $M_H$ of the shaft 6 is also the center of the inner element 10. The centers of the two plates 13 and 14 follow a path like the path E as they are mounted fixedly on the annular element 11. The recesses 15 in combination with the rollers 16 constitute guide means.

The plates 14 and 3 act together as distributor valve means by virtue of conduits or passages provided through them and by virtue of the motion of the plate 14, which motion as noted above, is exactly like that of the annular element 11. Specifically plate 14 is provided with conduits or passages therethrough each constituting a bore 18 communicating with a radial groove 17 which radial groove constitutes the opening of a conduit at a face of the plate 14, and plate 3 is provided with two sets of conduits therethrough, one set consisting of radial grooves 20 communicating with an annular common conduit or groove 23 and radial grooves 21 communicating with an annular common conduit or groove 26. An inlet conduit 24 provided through the back wall member 4 of the casing communicates with common conduit 23, and an outlet conduit 27 through the back wall member 4 of the casing communicates with common conduit 26. Communication between radial grooves 20 and common conduit 23 is through bore 22 and communication between radial slots 21 and common conduit 26 is through bores 25.

The spaces between the concavities and convexities of the inner and annular elements constitutes chambers 19. Each of the radial grooves 17 follows a circular path, of a corresponding one of the radial grooves 17. Accordingly, the radial groove 17 periodically comes into at least partial registry with one of the radial grooves 20 and 21. Only one of the radial grooves 20 and 21 at a time is in at least partial registry with the radial grooves 17 because the radial grooves 20 and 21 are circumferentially spaced apart from one another by a distance at least equal to the width of the radial groove 17. Communication is alternatingly established between the chambers 19 and the inlet and outlet conduits 24 and 27.

Counteracting means are provided to counteract or balance the pressure exerted by the fluid at the side of the elements 10 and 11 at which the plates 14 and 3 are disposed. The counteracting means includes conduits 28 and 30 communicating respectively between radial slots 20 and annular groove 29 and between radial slots 21 and annular groove 31. Pressure exerting means are provided consisting of annular members or rings 32 and 33 slidably mounted in annular grooves 28 and 29 and plate 34. Annular members 32 and 33 are slidable in the annular grooves 28 and 29 in the direction of the axis of the shaft 6. Similarly, plate 34 is slidably mounted in a recess in the front wall member 1 of the casing whereby it is slidable in the direction of the axis of the shaft 6. The conduits 28 and 30 are in ultimate communication with the common conduits 23 and 26, respectively, since the radial grooves 20 and 21 are in communication with the common conduits 23 and 26, respectively. Fluid pressure transmitted through the conduits 28 and 30 displaces the annular members 32 and 33, respectively, toward and into a bearing relation against the plate 34. The plate 34 is in turn urged against the plate 13 and thereby the fluid pressure on the other side of the elements 10 and 11 is counteracted.

Viewing the device from the end at which the shaft 6 protrudes, when the shaft 6 is rotated counterclockwise, the device operates as a pump, sucking large quantities of a liquid through the inlet conduit 24 and discharging the liquid through the outlet conduit 27. On the other hand, when it is desired to use the device as a gear engine, the shaft 6 is not connected to a driving means, a fluid under pressure is supplied to the inlet conduit 24 and the fluid imparts a relatively large moment of rotation to the shaft 6 and the shaft 6 rotates in the aforementioned direction; the fluid discharges through the outlet conduit 27. By reversing the direction of flow through the device by making the outlet conduit the inlet conduit and vice versa, the direction of rotation of the shaft is reversed.

The invention is not to be construed as limited to the particular forms disclosed herein, since these are to be regarded as illustrative rather than restrictive. Thus, for example, distributor valve means as described herein can be placed on either side of the chambers 19, of which one distributor valve means is arranged to cooperate with the inlet conduit and the other distributor valve means is arranged to cooperate with the outlet conduit. Furthermore, the annular element rather than the inner element may be mounted on the shaft, in which arrangement the inner element would be guided so that its center would describe a circular path about the center of the shaft. Also, either the inner element or annular element may be so arranged as both to rotate with the shaft and also to have its center guided in a circular path about the center of the shaft.

What I claim and desire to secure by Letters Patent is:

1. A rotary device for interacting with a fluid comprising a casing enclosing an annular element, an inner element disposed internally and eccentrically of said annular element, said annular element having an inner surface having alternating covexities and concavities and said inner element having an outer surface having alternating convexities and concavities, the number of said convexities of said annular element exceeding the number of said convexities of said inner element, a shaft rotatably mounted in said casing and mounting one of said elements, the concavities and convexities, respectively, of said inner element being engageable with the convexities and concavities, respectively, of said annular element and the distance between a substantially opposed concavity and convexity of said annular element being at least equal to the distance between substantially opposed concavities of said inner element, whereby, upon rotation of said shaft, at any given moment only some of the concavities and convexities, respectively, of said inner element are in engagement with only some of the convexities and concavities, respectively, of said annular element and said engagement motivates the aforementioned one of said elements in said circular path of said center thereof, an inlet conduit and an outlet conduit defined through said casing, a first plate mounted for rotation of its center about the axis of said shaft and having a face constituting a common wall of chambers defined by spaces between said concavities and said convexities of said elements, a conduit defined through said first plate and communicating with one of said chambers and including an opening on the other face of said first plate, guide means to guide the element other than the element mounted on said shaft in movement parallel to the rotation of said shaft, whereby the center of said other element describes a circular path about the axis of said shaft, said guide means constituting arcuate recesses in the periphery of said other element and rollers rotably mounted on fixed axes to engage said arcuate recesses, a second plate fixedly mounted in said casing and having a face contacting said other face of said first plate, a conduit defined through said second plate and communicating with one of said conduits defined through said casing and including an opening on said face of said second plate, the opening on the first plate and the opening on the second plate being so disposed that upon rotation of said shaft they periodically come into and out of at least partial registry and thereby communication between said one of said chambers and said one of said conduits defined through said casing is established when said openings are in said at least partial registry and terminated when said openings are out of said at least partial registry.

2. A rotary device according to claim 1, in which said rollers are each in the configuration of a cylinder having a diameter smaller than the diameter of said recesses.

3. A rotary device according to claim 2, in which the centers of said rollers lie on a first common circle and the centers of said arcuate receses lie on a second common circle.

4. A rotary device according to claim 3, in which the diameter of said second common circle is greater than the diameter of said first common circle.

References Cited
UNITED STATES PATENTS

| | | | |
|---|---|---|---|
| 1,968,113 | 7/1934 | Weaver | 123—124 |
| 2,861,481 | 11/1958 | Sundt | 74—804 X |
| 3,106,163 | 10/1963 | Mosbacher | 103—130 XR |
| 1,770,468 | 7/1930 | Ford | 74—805 |
| 3,125,032 | 3/1964 | Smith | 103—131 |
| 3,240,158 | 3/1966 | Brundage | 103—126 |
| 3,270,683 | 9/1966 | McDermott | 103—126 XR |
| 3,272,142 | 9/1966 | Easton | 103—130 |
| 3,289,542 | 12/1966 | Fikse | 103—130 XR |
| 3,304,808 | 2/1967 | Grant | 74—805 XR |
| 3,309,999 | 3/1967 | Patterson | 103—130 |

DONLEY J. STOCKING, *Primary Examiner.*

WILBUR J. GOODLIN, *Assistant Examiner.*

U.S. Cl. X.R.

74—804